(12) United States Patent
Diehm et al.

(10) Patent No.: US 7,534,978 B2
(45) Date of Patent: May 19, 2009

(54) PROCESS CHAMBER OF AN INSTALLATION FOR THE THERMAL TREATMENT OF PRINTED CIRCUIT BOARDS

(75) Inventors: Rolf Ludwig Diehm, Wertheim (DE); Rudolf Ullrich, Kreuzwertheim (DE)

(73) Assignee: SEHO Systemtechnik GmbH, Kreuzwertheim (DE)

( * ) Notice: Subject to any disclaimer, the term of this patent is extended or adjusted under 35 U.S.C. 154(b) by 685 days.

(21) Appl. No.: 10/517,522

(22) PCT Filed: Jun. 11, 2003

(86) PCT No.: PCT/EP03/06131

§ 371 (c)(1),
(2), (4) Date: Jun. 22, 2005

(87) PCT Pub. No.: WO03/106092

PCT Pub. Date: Dec. 24, 2003

(65) Prior Publication Data

US 2005/0247301 A1    Nov. 10, 2005

(30) Foreign Application Priority Data

Jun. 14, 2002 (DE) .............................. 102 26 593

(51) Int. Cl.
*F27B 5/14* (2006.01)
*F24H 3/00* (2006.01)

(52) U.S. Cl. ............... 219/390; 219/388; 219/487; 219/488; 219/209; 219/210; 219/212; 219/216; 219/217; 219/219; 219/221; 219/232; 219/233; 99/474; 99/475; 99/476; 99/477; 228/180.1

(58) Field of Classification Search .................. 219/388, 219/390, 487–8, 209–10, 212, 216–7, 219, 219/224, 221, 232–3; 126/21 A, 99 A, 99 R; 99/474–7; 228/180.1, 108.21
See application file for complete search history.

(56) References Cited

U.S. PATENT DOCUMENTS 5,230,460 A * 7/1993 Deamborsio et al. ..... 228/180.1

FOREIGN PATENT DOCUMENTS

DE 44 16 959 A 11/1995

\* cited by examiner

*Primary Examiner*—Shawntina Fuqua
(74) *Attorney, Agent, or Firm*—Houston Eliseeva LLP

(57) ABSTRACT

A process chamber of an installation for the thermal treatment of printed circuit boards is described. The process chamber may include a fan wheel supported on a shaft parallel to the printed circuit boards, the fan wheel being disposed between two walls of the process chamber. The fan wheel is open at its two end faces and the two end faces are at such a distance from the walls of the process chamber that gas flows in unimpeded in two substreams between the end faces of the fan wheel and the walls and flows out from the cylindrical surface of the fan wheel over the length thereof and in the extent of the process chamber in the form of a ribbon-shaped gas stream, the gas stream being directed essentially in the cross section through a channel onto the printed circuit boards.

3 Claims, 4 Drawing Sheets

PROCESS CHAMBER OF AN INSTALLATION FOR THE THERMAL TREATMENT OF PRINTED CIRCUIT BOARDS

This application is a National Stage application of co-pending PCT application PCT/EP03/06131 filed Jun. 11, 2003, which claims the benefit of German application Ser. No. 102 26 593.3 filed Jun. 14, 2002. These applications are incorporated herein by reference in their entireties.

FIELD OF THE INVENTION

The invention relates to a process chamber of an installation for the thermal treatment of printed circuit boards or similar, with a fan wheel supported on a shaft parallel to the printed circuit boards, said fan wheel being disposed between two walls of the process chamber.

BACKGROUND

Such a process chamber is presented and described in DE OS 4416959. This process chamber employs a fan wheel which draws in gas, more particularly air, from the environment and supplies it into a channel, said channel extending between the walls of the process chamber and being directed onto the printed circuit boards which are to be treated. The gas is supplied to the fan wheel via the periphery thereof and is carried away from the surface thereof, the gas also partially entering the open interior space of the fan wheel and, owing to the rotation thereof and the blades contained in the fan wheel, being transported away therefrom because of the centrifugal force imparted to the gas. It has been shown that, with such a process chamber, it is possible to produce gas streams of only limited gas pressure. In order to produce the gas velocity necessary for the treatment of the printed circuit boards, the fan wheel must be operated at high rotational speed, something which is undesired in view of the required drive and wear of the bearings; of the fan wheel. There is also the fact that the melting of the solder applied to the printed circuit boards calls for a high temperature, e.g. up to 400° C., of the gas, this correspondingly increasing the tendency to wear, especially of the bearings of the fan wheel.

SUMMARY

The object of the invention is to avoid these disadvantages and to provide the process chamber with a structure in which the fan wheel can be operated at considerably lower rotational speed. The object of the invention is achieved in that the fan wheel is open at its two end faces and the two end faces are at such a distance from the walls of the process chamber that gas flows in unimpeded in two substreams between the end faces of the fan wheel and the walls and flows out from the cylindrical surface of the fan wheel over the length thereof and in the extent of the process chamber in the form of a ribbon-shaped gas stream, said gas stream being directed essentially in said cross section through a channel onto the printed circuit boards.

This design of the process chamber results, in comparison with the known process chamber, in a fundamentally different behaviour of the gas flow, namely the inflow of the gas by means of the two substreams via the two open end faces of the fan wheel, which, with its blades, imparts a rotational motion to the gas, which is supplied to the fan wheel from the inside, wherein the thereby occurring centrifugal forces cause the gas to be thrown radially away from the surface of the fan wheel without this passage of the gas being in any way impeded by gas supplied from the outside. The consequence of this is a high throughput of gas by means of the thus operated fan wheel, as a result of which the fan wheel can be operated at correspondingly low rotational speed and still produce a high throughput with correspondingly high gas pressure. The away-transported gas is in the form of a ribbon-shaped gas stream of an extent according to the dimensions of the process chamber, with the result that said ribbon-shaped gas stream can be directed directly through an appropriately formed channel in the cross section of the gas stream onto the printed circuit boards and thus impact said printed circuit boards in the form of a gas stream which is uniform across the extent of the process chamber, without the possibility of any cross-flows or undefined turbulences.

Advantageously, the process chamber is accommodated in a housing, said housing forming with housing plates an intermediate space with respect to the walls of the process chamber, in which intermediate space the two substreams are guided and are supplied through penetrations in the housing plates to the end faces of the fan wheel. This guiding of the two substreams results in a clear separation from the ribbon-shaped gas stream, which is thus unable to become mixed with the substreams and, consequently, impacts without obstruction on the printed circuit boards which are to be treated.

The fact that the process chamber is accommodated in the housing makes it possible for the fan wheel to be supported on one side in one of the two walls. This has the advantage that, if any repairs are required, the removal and installation of the fan wheel is considerably facilitated.

The thermal treatment of printed circuit boards by means of the process chamber may involve either the heating of printed circuit boards for the purpose of melting the solder joints or the cooling thereof. In the case of heating, the process chamber is additionally provided with heating bars extending parallel to the fan wheel in the ribbon-shaped air stream, as presented in the aforementioned DE-OS 44 16 959 in FIG. 2. For the purpose of cooling, a heating bar may be replaced by a cooling bar provided with a cooling liquid. Therefore, the process chamber can be versatilely used for any kind of thermal treatment of printed circuit boards.

BRIEF DESCRIPTION OF THE DRAWINGS

Illustrative examples of the invention are presented in the drawings, in which.

DETAILED DESCRIPTION

Figure 1:
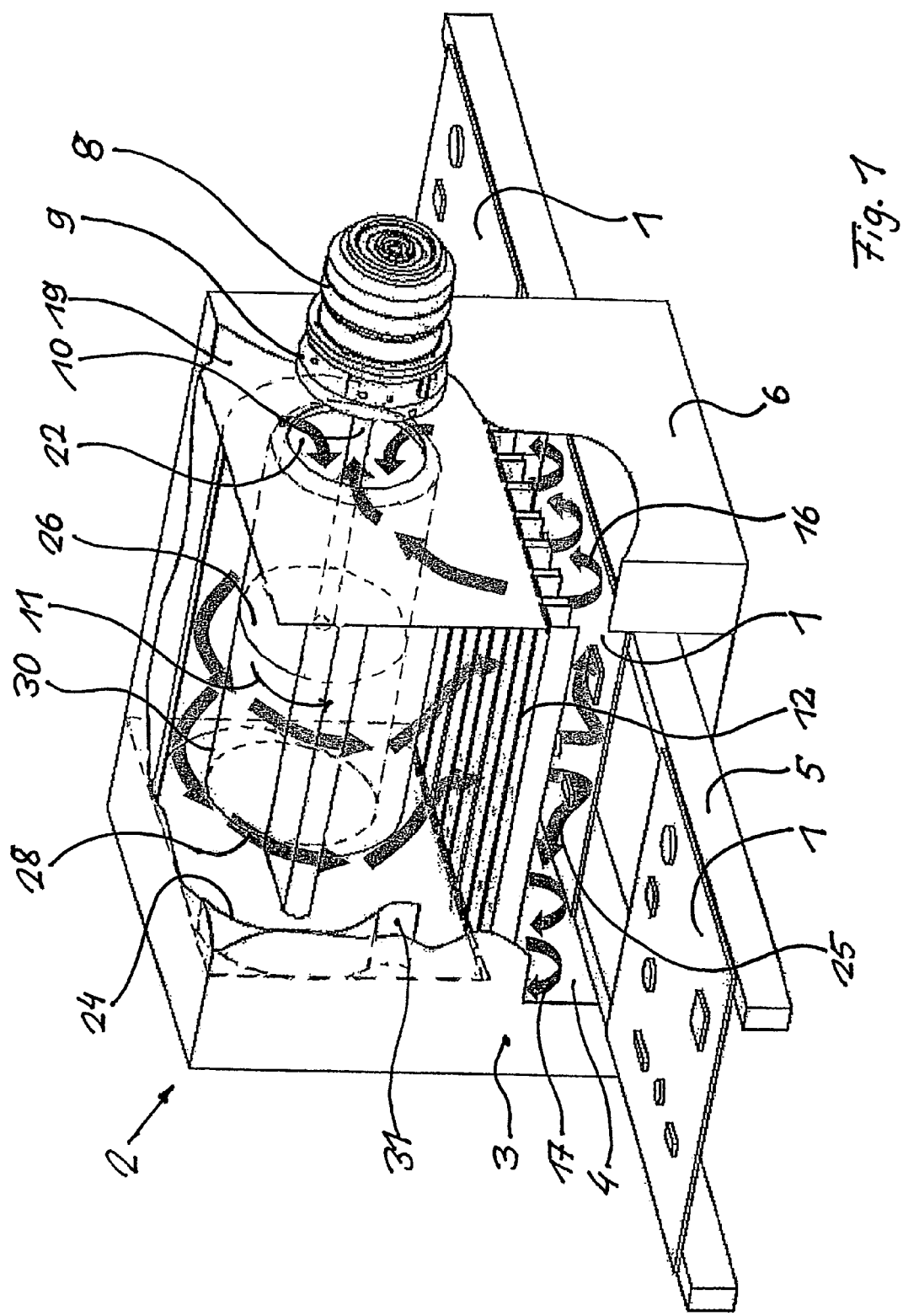
FIG. 1 shows the process chamber, in a partially cut-away representation, in a perspective view.

The process chamber shown in FIG. 1, which is used for the thermal treatment of printed circuit boards 1, is enclosed by the housing 2, the front wall 3 of said housing 2 having been partially cut away in order to permit a view of the interior space. Said front wall 3 has an inlet slot 4 which is penetrated by the conveying device 5 for transporting the printed circuit boards 1 into the process chamber. The conveying device 5 is a conventional subassembly of the kind used in versatile manner in connection with soldering machines. At the sides, the housing 2 is bounded by side walls, of which only the right-hand side wall 6 is visible. A similar side wall 7 adjoins the front wall 3 on the left-hand side of the process chamber (see FIG. 2).

Figure 4:
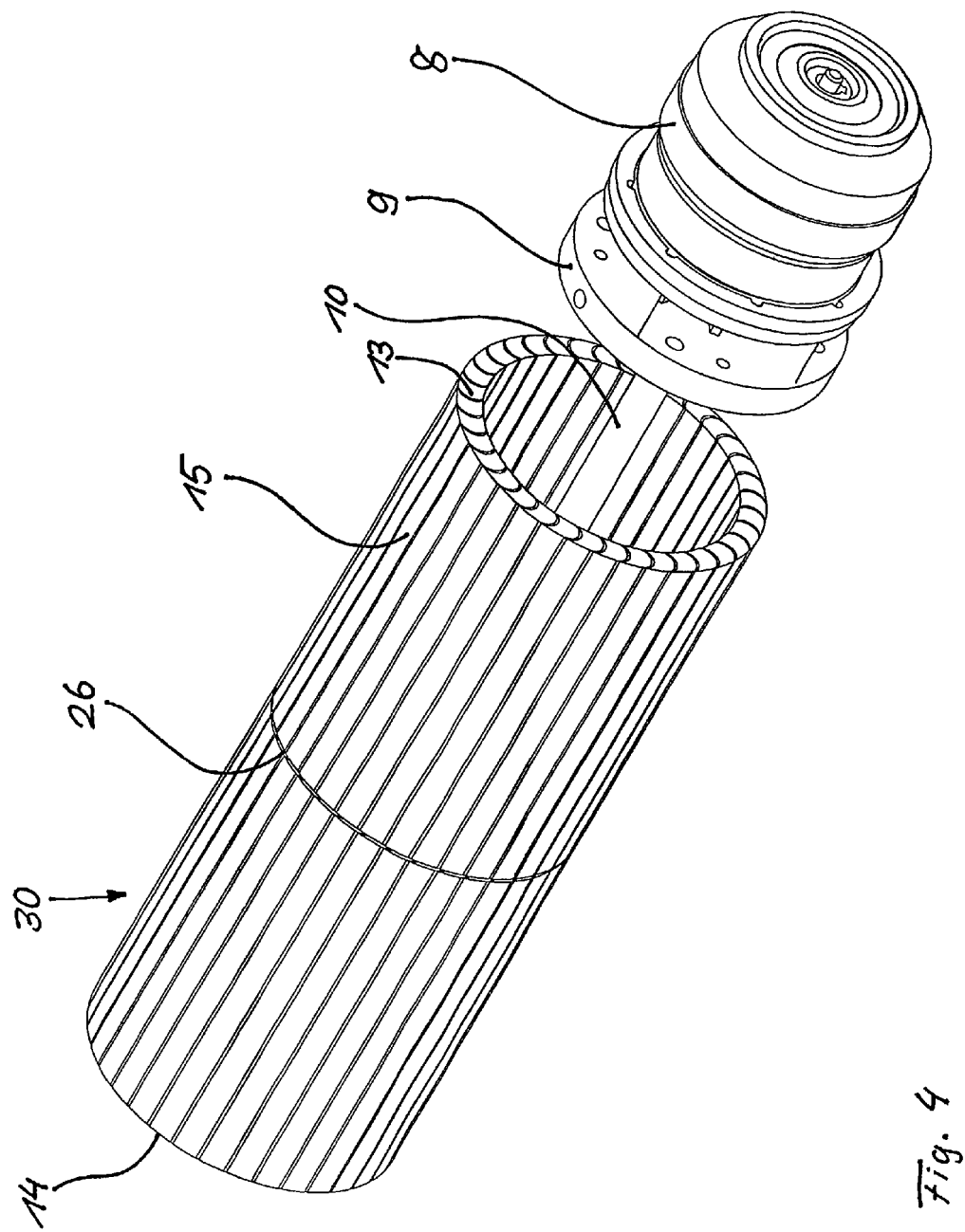
FIG. 4 shows the fan wheel with its drive on its own in a perspective view.

The housing 2 accommodates the fan wheel 30, which is separately illustrated in FIG. 4. The fan wheel 30 is driven by the drive motor 8, which is attached by means of the flange 9 to the side wall 6 of the housing 2. The drive motor 8 drives the fan wheel 30 through the intermediary of the shaft 10 thereof in the direction of rotation represented by the arrow 11, i.e. in an anticlockwise direction as viewed from the drive motor 8 along the shaft 10 onto the fan wheel 30. With its blades 15 shown in FIG. 4 (omitted in FIG. 1 for better clarity), the fan wheel 30 produces a ribbon-shaped gas stream according to the bolded arrows 28, said ribbon-shaped gas stream being directed onto the nozzle plate 12 below the fan wheel 30, penetrating the nozzle plate 12 in directional gas streams and then impacting on a therebelow-positioned printed circuit board 1 and performing the desired thermal treatment thereon. This gas flow issuing from the fan wheel 30 is made possible by the fact that the fan wheel 30 is open at its two end faces (reference characters 13 and 14 in FIG. 2) and, through said open end faces, draws in gas which thereafter flows into the interior space of the fan wheel 30, from where, owing to the action of the blades 15 (see FIG. 4), the gas is blown away radially outwards by the thus produced centrifugal force. After impacting on a printed circuit board 1 which is to be treated, the gas streams issuing from the nozzle plate 12 are laterally deflected, as is shown by the arrows 16 and 17. These thus deflected gas streams form two substreams which are symbolized on the one hand by the arrows 16 and on the other hand by the arrows 17. These two substreams each run in an intermediate space 18 (see FIG. 2) which is formed on the one hand by the side walls 6 and 7 (see FIG. 2) and by the housing plates 19 and 20 (see FIG. 2), of which the housing plate 19 is also visible in FIG. 1. The housing plates 19 and 20 extend above the nozzle plate 12 over the entire area of the side walls 6 and 7, thereby forming the intermediate space 18 required for guiding the two substreams (arrows 16 and 17), which substreams then pass through penetrations, coaxial with the shaft 10, in the housing plates 22 and 23 (see FIG. 2) and enter the interior space of the fan wheel 30.

This guiding of the gas in the interior space of the process chamber gives rise at the circumference of the fan wheel 30 to an essentially ribbon-shaped gas stream, which is represented by the bolded arrows 28 enclosing the fan wheel 30. Said ribbon-shaped gas stream has a width equivalent to the length of the fan wheel 30. It is guided in the inside of the housing 2 by the guide plate 24, which encircles the fan wheel 3Q at a distance (see also FIG. 3), the end 31 of said guide plate 24 then directing the ribbon-shaped gas stream onto the nozzle plate 12.

Figure 2:
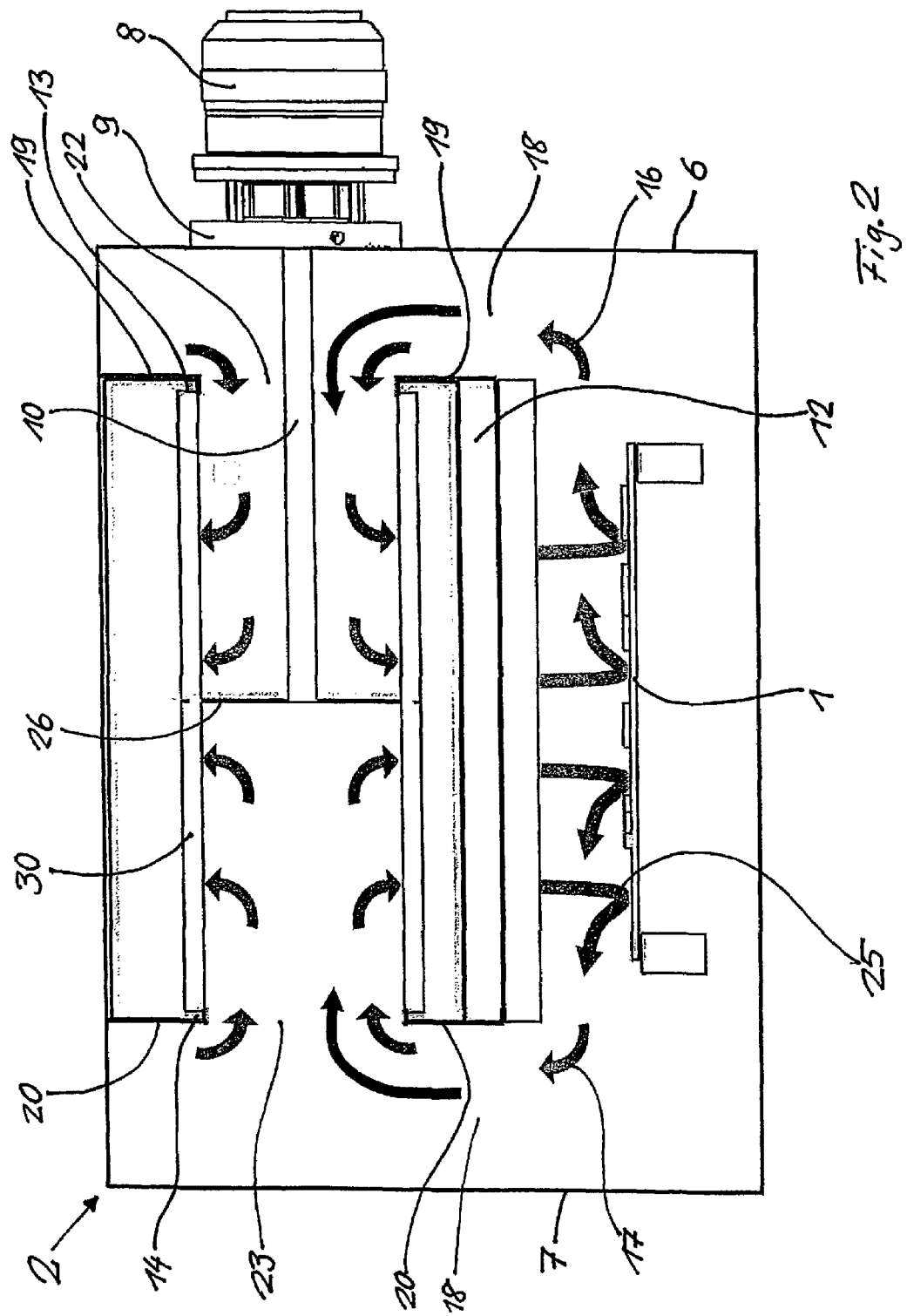
FIG. 2 shows the process chamber without the front wall of the housing, through which front wall the printed circuit boards enter the housing, in a schematic representation.

FIG. 2 shows the process chamber with the housing 2 with a top plan view of the front wall 3 (see FIG. 1), which front wall 3, however, has been omitted in FIG. 2 in order to permit a view of the inside of the housing 2. It is evident therefrom how the two substreams (arrows 16 and 17) are directed out of the intermediate spaces 18 into the inside of the fan wheel 30, this being accomplished through the penetrations 22 and 23. Furthermore, FIG. 2 clearly shows how, after passing through the nozzle plate 12, represented by the bolded arrows 25 below the nozzle plate 12, the ribbon-shaped gas stream impacts on the printed circuit board 1, is deflected by said printed circuit board 1 and is divided into the two substreams (arrows 16 and 17).

FIG. 2 also shows the attachment of the drive motor 8 for the fan wheel 30, said drive motor 8 being attached to the side wall 6 through the intermediary of the flange 9 and driving the fan wheel 30 by means of the shaft 10. For its internal support, said shaft 10 is provided with the supporting disc 26, to which the individual blades 15 of the fan wheel 30 are attached.

Figure 3:
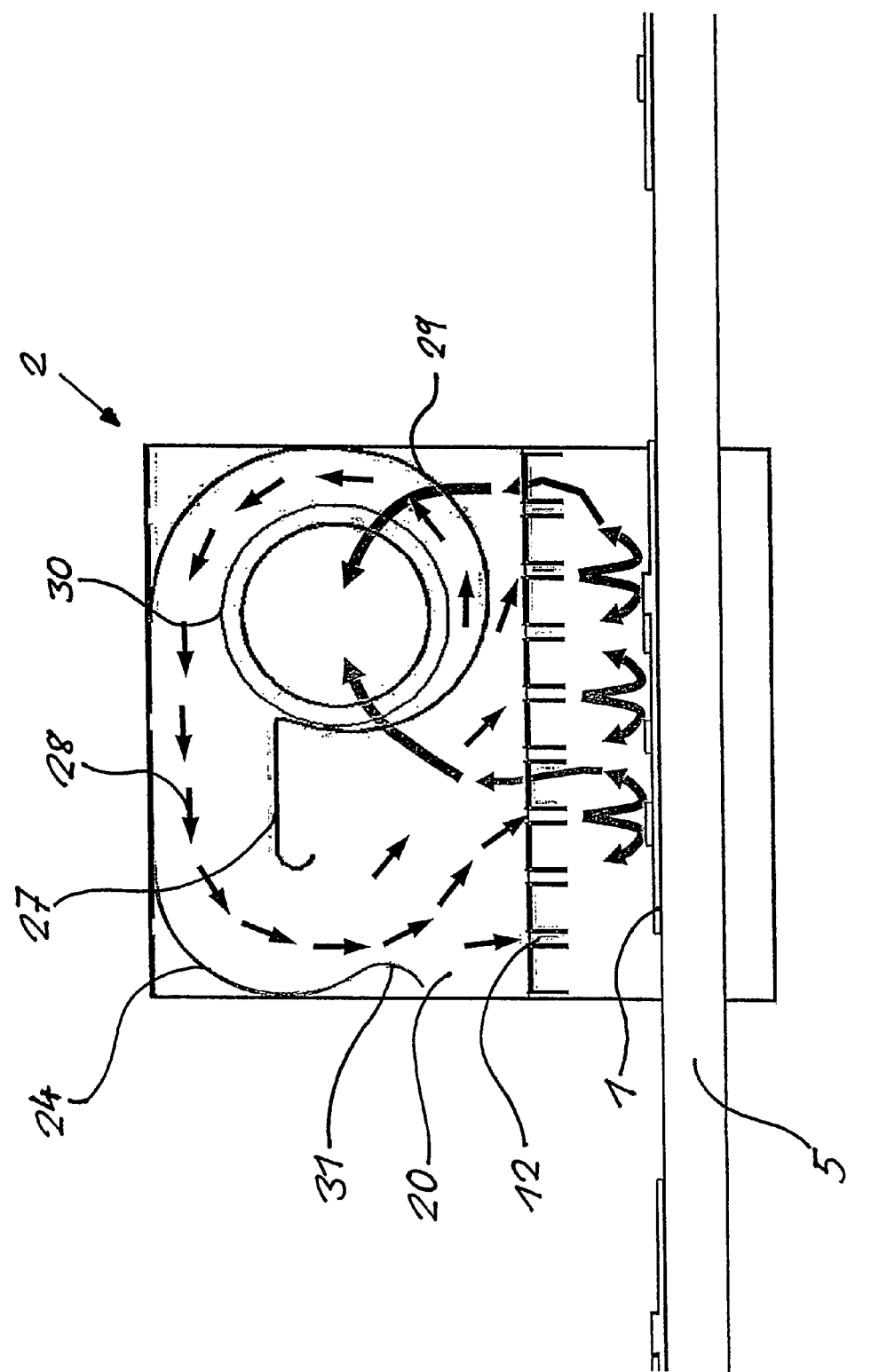
FIG. 3 shows the process chamber without a side wall of the housing, said side wall serving to support the drive for the fan wheel, likewise in a schematic representation.

FIG. 3 presents the process chamber in a side view looking onto the housing plate 19 (FIG. 1), the side wall 6, however, having been omitted in order to permit a view of the inside of the housing 2. FIG. 3 clearly shows the ribbon-shaped gas stream 28, which is produced by the fan wheel 30 and is directed by the nozzle plate 12 onto the printed circuit hoard 1. The ribbon-shaped gas stream 28 is directed by the guide plate 24 onto the nozzle plate 12. The guide plate 24 is continued opposite to the direction of flow of the gas stream 28 and encircles the fan wheel 30 in the round portion 29, which finally merges into the projection 27, said projection 27 directing the gas stream, after leaving the fan wheel 30, away therefrom. The round portion 291 is so arranged that its distance from the fan wheel 30, viewed in the direction of flow, constantly increases so as to be able to accept the increasing air volume of the gas stream 28 with increasing cross section.

FIG. 4 presents the fan wheel 30 together with the drive motor 8 on its own. FIG. 4 shows the individual blades 15, said blades 15 being arranged in known manner about the shaft 10 and being held together and secured by the centre disc 26. The centre disc is, as shown in FIG. 2, attached to the shaft 10.

What is claimed is:

1. Process chamber of an installation for the thermal treatment of printed circuit boards (1), with a fan wheel (30) supported on a shaft (10) parallel to the printed circuit boards (1), said fan wheel (30) being disposed between two walls (6, 7) of the process chamber, characterized in that the fan wheel (30) is open at its two opposing end faces (13, 14) and the two opposing end faces (13, 14) are configured as a pair of intakes such that gas flows in unimpeded in two substreams (16, 17) into the two opposing end faces (13, 14) of the fan wheel (30) and flows out from the cylindrical surface of the fan wheel (30) over the length thereof and in the extent of the process chamber in the form of a ribbon-shaped gas stream (28), said gas stream (28) being directed essentially in said cross section through a channel (29, 24) onto the printed circuit boards (1).

2. Process chamber according to claim 1, characterized in that said process chamber is contained in a housing (2), said housing (2) forming with housing plates (19, 20) an intermediate space (18) with respect (6, 7) of the process chamber, in which intermediate space (18) the two substreams (16, 17) are guided and are supplied through penetrations (22, 23) in the housing plates (19, 20) to the two opposing end faces of the fan wheel (30).

3. Process chamber according to claim 1, characterized in that the fan wheel (30) is supported on one side in one of the two walls (6, 7).

* * * * *

UNITED STATES PATENT AND TRADEMARK OFFICE
CERTIFICATE OF CORRECTION

PATENT NO. : 7,534,978 B2
APPLICATION NO. : 10/517522
DATED : May 19, 2009
INVENTOR(S) : Rolf Ludwig Diehm and Rudolf Ullrich It is certified that error appears in the above-identified patent and that said Letters Patent is hereby corrected as shown below:

In Claim 2, Column 4, Line 52, after "respect," insert --to walls--.

Signed and Sealed this

Eighteenth Day of August, 2009

David J. Kappos
*Director of the United States Patent and Trademark Office*